United States Patent Office 3,689,331
Patented Sept. 5, 1972

3,689,331
NITROCELLULOSE BASE COMPOSITIONS AND
METHOD FOR MAKING SAME
Everette M. Pierce, Somerville, Ala., assignor to the United States of America as represented by the Secretary of the Army
No Drawing. Filed Feb. 28, 1964, Ser. No. 348,907
Int. Cl. C06d 5/06
U.S. Cl. 149—18         11 Claims This invention relates to improved nitrocellulose-base compositions and a method for preparing improved nitrocellulose-base compositions. As used herein, the terminology "nitrocellulose-base compositions" refers to any plasticized nitrocellulose-containing composition, particularly rocket propellants including double-base compositions.

In spite of the fact that there are now available many so-called high energy or "exotic" solid docket propellants, various rocket motors now in use and under development utilize nitrocellulose-base propellant composition. Nitrocellulose-base compositions have long been available as gunpowders and explosives. However, the use of these compositions as rocket propellants presents problems in regard to their temperature-dependent physical properties.

One requirement for an ideal solid propellant is that its physical properties permits its employment over a fairly wide temperature range, preferably from —40° F. to 140° F. A satisfactory solid propellant should be flexible enough at lower temperatures to withstand handling and firing without fracturing the grain. At higher temperatures, the propellant must have sufficient firmness so that it does not melt, flow, or otherwise become deformed.

Nitrocellulose-base compositions used as explosives and gunpowders do not meet these temperature requirements, especially at lower temperatures. Even the nitrocellulose-base compositions now used as rocket propellants are not completely satisfactory because of their brittleness at low temperatures.

One method for overcoming this disadvantage has been to increase the amount of plasticizer used in the nitrocellulose compositions. Upon curing this increase in plasticizer content renders the nitrocellulose-base composition more flexible at lower temperatures. However, there is a limit as to the amount of plasticizer which can be incorporated in the compositions. Ordinarily, the maximum weight ratio of plasticizer to the total weight of plasticizer and nitrocellulose is from about 0.1:1.0 to about 0.45:1.0 depending on the plasticizer and intended use of the composition. Beyond this point, the nitrocellulose plasticizer mixture will not cure into a tough elastic composition. The excess plasticizer may even separate as a liquid. Moreover, excess plasticizer makes the propellant composition so soft and putty-like even at room temperatures that it will not retain the required grain configuration. It would, therefore, be very desirable if larger amounts of plasticizer could be incorporated into nitrocellulose compositions to improve the physical properties at lower temperatures without adversely affecting the properties at higher temperatures.

It has now been determined that if ferrocene is mixed with nitrocellulose in a weight ratio of ferrocene to nitrocellulose of about 1:5 to about 1:20, the weight ratio of plasticizer to the total weight of plasticizer and nitrocellulose can be increased up to about 0.8:1.0 and slightly higher. This additional plasticizer content greatly increases the flexibility of nitrocellulose-base compositions at low temperatures (down to —40° F.). At the same time the compositions can withstand higher temperatures (140° F.) without deformation of the propellant grain or separation of liquid plasticzer. In fact, the compositions exhibit slightly improved characteristics at higher temperatures. Another unexpected advantage of the incorporation of ferrocene into nitrocellulose according to the present invention is that it permits completely satisfactory curing of nitrocellulose having a low nitrogen content (that is, less than 12.5% N) using plasticizers that ordinarily would not permit a cure of the nitrocellulose. This advantage permits variation in nitrocellulose-base compositions that otherwise would be impossible since nitrocellulose containing smaller amounts of nitrogen can be utilized and cured. A further advantage of the ferrocene additive is that it accelerates the burning rate of nitrocellulose-base rocket propellants.

It will be immediately apparent to those skilled in the art that the invention will find use in areas other than rocket propellants. Nitrocellulose base compositions such as coatings, films, and molded articles can be made tougher and more flexible by incorporating ferrocene into the compositions.

In addition to ferrocene itself, any ferrocene derivative which is compatible with nitrocellulose can be used in the present invention. The ratio of ferrocene derivative to nitrocellulose set forth hereinabove can be varied to keep the amount of the ferrocene (i.e. dicyclopentadienyliron) nucleus to nitrocellulose substantially within the ratios specified for ferrocene. That amount of ferrocene derivative required to yield the same number of dicyclopentadienyliron nucleii as a given amount of ferrocene is hereinafter referred to as the "equivalent amount of ferrocene derivative." Obviously mixtures of ferrocene with at least one ferrocene derivative or mixtures of at least two ferrocene derivatives come within the scope of the present invention. For lack of a better term, ferrocene, ferrocene derivatives and mixtures thereof contemplated by the present invention will be collectively referred to as "curing agents" hereinafter.

In accordance with the foregoing, it is an object of the present invention to provide improved nitrocellulose-base compositions.

Another object is to provide improved nitrocellulose-base compositions which contain relatively large amounts of plasticizing agent.

A futher object of the invention is to provide cured nitrocellulose-base rocket propellant compositions having improved temperature-dependent physical properties.

A still further object is to provide a method for curing nitrocellulose with conventional plasticizers in a manner which permits increasing the plasticizer content of the resulting nitrocellulose-base composition.

An additional object of the present invention is to provide a method of curing nitrocellulose with conventional plasticizing agents even though the nitrogen content of the nitrocellulose is less than that which is ordinarily necessary for curing to take place.

The manner in which these as well as other objects can be accomplished will become apparent from the following detailed description.

To clarify the description of the invention presented herein, it is necessary to define the following terms: curing, gelatinizing, and gelling. As is well known, plasticizers for nitrocellulose cause it to gel or gelatinize. In other words, the plasticizer and nitrocellulose form a colloidal dispersion which is very soft. As used herein the terms "gelatinize" and "gel" (as well as other forms of these two words) are used interchangeably to describe this initial reaction of nitrocellulose and plasticizer to form this soft, colloidal dispersion. It is obvious that this gelled or gelatinized nitrocellulose-plasticizer dispersion is not satisfactory for use as a solid propellant. However, upon the application of mild heat over a period of time, it is possible for the disperison to cure into a tough, elastic, rubbery solid if the ratio of plasticizer to nitrocellulose is within certain limits and provided that the nitrocellulose has a nitrogen content of at least 12.5% as previously pointed out above. Thus, the term "cure" (and other forms of the word) are intended to describe the transformation of the soft, colloidal dispersion into a tough, rubbery solid.

As previously mentioned, ferrocene (dicyclopentadienyliron) is the preferred curing agent of the present invention because of its availability and the results achieved through its use. However, ferrocene derivatives are also completely acceptable for use as gelling agents in the present invention. Suitable ferrocene derivatives include but are not limited to lower alkanoyl substituted ferrocene derivatives where the alkanoyl group can contain up to six carbon atoms such as acetylferrocene; 1,1'-diacetylferrocene; 1,2-diacetylferrocene; and propionylferrocene; lower alkyl substituted ferrocene wherein the alkyl groups can contain up to six carbon atoms such as butylferrocene and methylferrocene; hydroxyalkyl substituted ferrocene derivatives wherein the hydroxyalkyl substituent can contain up to six carbon atoms as exemplified by hydroxymethylferrocene; ferroceneacetonitrile; and ferrocenecarboxylic acid.

The nitrocellulose contemplated for use with the present invention will contain from about 11.0% by weight nitrogen to about 13.0% nitrogen. Since the invention is primarily concerned with improving nitrocellulose-base rocket propellants, the nitrogen content of the nitrocellulose will be at least 11.9% and usually about 12.5%.

Any of the well known plasticizers for nitrocellulose can be used in gelatinizing nitrocellulose according to the present invention. Illustrative of these plasticizers are the nitrate esters (e.g. nitroglycerin, hydroxyglycerol trinitrate, butane triol dinitrate, diethylene glycol dinitrate, triethylene glycol dinitrate (TEGDN), trimethylolethane trinitrate (TMETN), and mixtures of at least two of these), dibutyl phthalate, dimethyl sebacate, dibutyl succinate, dibutyl adipate, triacetin, ethyl diphenyl phosphate, tributyl phosphate, tetrazole derivatives as shown in U.S. Pat. 3,073,731, and dinitriles as set forth in U.S. Pat. 3,104,190. Moreover, mixtures of at least two of any of these plasticizers are also satisfactory for use with the invention. However, the nitrate esters constitute the preferred class of plasticizers.

When the so called "energizing," "explosive," or "autooxidizing" plasticizers (for example, nitroglycerin) are used in the nitrocellulose-base propellant compositions contemplated by the present invention, there is sufficient oxidizer included within the cured nitrocellulose-plasticizer composition to assure substantially complete combustion. On the other hand, if an excess of a plasticizer such as TEGDN is used, there is not enough oxidizer in the nitrocellulose and plasticizer to provide for complete burning of the composition. In this case it is desirable to incorporate additional oxidizer into the composition. Suitable oxidizers for this purpose are pentaerythritol tetranitrate (PETN), cyclotetraethylenetetranitramine (HMX), cyclotrimethylenetrinitramine (RDX), or any of the tetranitrobutanes as exemplified by 1,1,4,4-tetranitrobutane, 2,2,3,3-tetranitrobutane, and the like. Likewise, powdered inorganic oxidizing agents illustrated by ammonium perchlorate, ammonium nitrate, and the alkali and alkaline earth metal chlorates, perchlorates, and nitrates (potassium perchlorate, sodium nitrate, and the like) could be used if desired. The amount of additional oxidizer required in a given composition will obviously depend on the amounts of plasticizer and nitrocellulose present and whether or not any other fuel constituent is present. However, the additional oxidizer ordinarily will not constitute more than 50% by weight of the total composition.

The improved nitrocellulose-base propellants prepared according to the invention can include any of the conventional additives including but not limited to burning rate modifiers such as iron powder, lead salicylate, lead azide, lead chromate, lead stearate, lead oxide, and ammonium perchlorate; stabilizers exemplified by symmetrical diethyl diphenyl urea, resorcinol, and 2-nitrodiphenylamine; pigments or fillers illustrated by zinc oxide, carbon black, titanium dioxide, candellila wax, sericite, and the like; high energy metallic fuels such as powdered metals like aluminum, lithium, magnesium, boron, their hydrides as well as the alloys of these metals with each other.

The exact amount of any additive to be used, if any, will depend on the specific composition and its intended use. Ordinarily, the combined weight of such additives, exclusive of the high energy fuels, does not constitute more than about 7% by weight of the total composition and preferably not more than about 3%.

In one aspect of the invention, a composition consisting essentially of a cured intimate admixture of nitrocellulose, a plasticizer for nitrocellulose in a weight ratio of plasticizer to total weight of plasticizer and nitrocellulose of up to about 0.8:1.0, and a curing agent is provided for use as a binder for composite propellant compositions in the same manner as conventional polymeric binders such as the polylactams, polyurethanes, polydienes, polysulfides, and the like. Thus, nitrocellulose and any of the aforementioned plasticizers when intimately mixed in the presence of a curing agent can serve as a binder to hold additional ingredients such as oxidizer, fuel particles, and the like by incorporating these ingredients into the nitrocellulose-plasticizer mixture before it gels. The nitrate esters are the preferred plasticizers and the weight ratio of gelling agent to nitrocellulose should be with the previously mentioned weight ratio of about 1:5 to about 1:20.

The propellant compositions contemplated by the present invention consist essentially of a cured intimate admixture of from about 5% to about 30% nitrocellulose, from about 30% to about 70% plasticizer (preferably a nitrate ester), about 1% to about 5% ferrocene, a ferrocene derivative or mixtures thereof, from 0% to about 20% of at least one powdered high-energy metal or metal hydride fuel (e.g. aluminum, lithium, boron, magnesium and their alloys), and from about 0% to about 50% of an oxidizer (preferably a powdered inorganic oxidizer), all percentages expressing percent by weight of total composition. Minor amounts of stabilizers, dyes, and other additives as described hereinabove can also be included if desired in amounts up to about 7% by weight of the total composition and preferably not more than about 3%.

The most preferred compositions are those which consist essentially of a cured intimate admixture of about 5% to about 15% nitrocellulose, about 30% to about 40% a nitrate ester plasticizer for nitrocellulose (particularly TEGDN), about 1% to about 2% ferrocene, ferrocene derivative, or mixtures thereof, about 15% to about 20% of a powdered high energy metal fuel, particularly aluminum, and 30% to 35% ammonium perchlorate (all percentages referring to percent by weight of total composition). Stabilizers and other additives can constitute a minor portion (up to about 3%) of the composition.

The method contemplated by the invention for preparing nitrocellulose-base propellant compositions comprises thoroughly mixing the plasticizer with the requisite amount of ferrocene or ferrocene derivative and thereafter bringing together the nitrocellulose (and other dry ingredients) in an intimate admixture by thorough stirring or agitation. If desired, the dry ingredients (aluminum powder, resorcinol, etc.) can be dry-mixed themselves before mixing with the plasticizer. Of course, any liquid additive can be mixed with the plasticizer before adding the dry ingredients. All mixing is conveniently performed at room temperature, that is in the range of 60° F. to 75° F., although this is obviously not a critical limitation. The mixture is then placed in a suitable mold or motor casing and allowed to cure. Increasing the temperature expedites the curing process. At about 120° F. to about 140° F., curing is complete in about 24 hours. At lower temperatures, several days may be required.

In its basic form, the instant method for gelatinizing nitrocellulose calls for thoroughly mixing the nitrocellulose with a plasticizer in a weight ratio of plasticizer to nitrocellulose of up to about 0.8:1.0 in the presence of ferrocene (or an equivalent amount of ferrocene derivative). The amount of ferrocene required depends on the amount of nitrocellulose present, that is, the amount of ferrocene should correspond to a weight ratio of ferrocene to nitrocellulose of about 1:5 to about 1:20. It is best to mix the ferrocene, ferrocene derivatives, or mixtures thereof with the plasticizer before adding the nitrocellulose to facilitate mixing. However this is not absolutely essential and the ferrocene can be added to the plasticizer along with the nitrocellulose or added to a nitrocellulose-plasticizer mixture. The important aspect is that the ferrocene be substantially uniformly mixed with the nitrocellulose and plasticizer before the nitrocellulose and plasticizer are set aside to cure (or gelatinize). Generally, the weight ratio of plasticizer to total weight of plasticizer should be at least 0.3:1.0.

Nitrocellulose-containing ball powders or nitrocellulose itself can obviously be used with the present invention. It is sometimes advantageous to incorporate additional oxidizers, stabilizers, and the like directly into the ball powder rather than mixing them separately into the composition. For example, oxidizers like RDX and HMX are safe to handle if they constitute part of the ball powder.

The following examples assist in further illustrating the invention.

EXAMPLE I (a) To 157 grams of ball powder (ball powder analysis: 90% nitrocellulose, 11.9%; 7.7% nitroglycerin, 2.3% 2-nitrodepenylamine) is added 10 grams of resorcinol and 150 grams of aluminum powder. These dry ingredients are mixed for about five minutes. In a separate container 373 grams of TEGDN and 10 grams of ferrocene are mixed for five minutes. The ball powder-aluminum-resorcinol mixture is then added to the TEGDN-ferrocene mixture and stirred for five minutes after which 300 grams of powdered ammonium perchlorate is added. Mixing is continued for forty minutes. The entire mix is then poured into a mold and cured for 24 hours at 120° F. The resulting composition was a tough, rubberlike, propellant which remained flexible at lower temperatures (down to —40° F.) but did not deform or lose any plasticizer at higher temperatures (140° F.).

(b) The same procedure is repeated except that only 50 grams of the ball powder is used. The propellant exhibited the same excellent temperature-dependent physical properties as before.

EXAMPLE II

The procedure set forth in Example I(a) is repeated except 12.2 grams of acetyl ferrocene is substituted for the ferrocene. The resulting composition is substantially identical to that produced in Example I.

EXAMPLE III (a) The procedure of Example I(b) is repeated with the elimination of any ferrocene. No curing of the composition occurs even after heating at 120° F. for 48 hours.

(b) The procedure of Example I(b) is repeated with the elimination of ferrocene and the substitution of trimethylolethane trinitrate (nitrocellulose plasticizer) for the TEGDN. Again no cure occurs even though the mix was heated at 120° F. for 48 hours.

This effectively demonstrates one of the advantages in the present method of preparing nitrocellulose-base compositions. Most conventional plasticizers, especially the nitrate esters, will not cure nitrocellulose compositions containing less than 12.5% N. However, in the presence of ferrocene or a ferrocene derivative such as described hereinbefore, these plasticizers will cure nitrocellulose containing only 11.9% nitrogen, or even less.

EXAMPLE IV

Ferrocene (1 gram) was added to 30 grams of TEGDN at room temperature and mixed for five minutes to insure complete dissolving of the ferrocene. Thereafter 24 grams of ball powder (analysis in weight percent: 21.9% nitrocellulose (12.6% N), 0.7% nitroglycerin, 76.8% RDX, 0.5% 2-nitrodiphenylamine) was added to the TEGDN-ferrocene solution stirred for about thirty minutes. The mix was then placed in an oven at 120° F. for 24 hours to cure. The resulting composition was a tough, flexible solid which exhibited excellent temperature-dependent physical properties. The composition consisted of 9.6% nitrocellulose, 54.5% TEGDN, 33.6% RDX, 1.8% ferrocene, .3% nitroglycerin, and .2% 2-nitrodiphenylamine.

EXAMPLE V

Using the procedure of Example IV, 24 grams of ball powder (analysis in weight percent: 21.9% nitrocellulose (12.6% N), 0.7% nitroglycerin, 76.8% HMX, 0.5% 2-nitrodiphenyl amine) was added with thorough mixing to 30 grams of TEGDN having dissolved therein 1.8 grams of acetylferrocene. After curing at 120° F. for 24 hours the composition was tough and very flexible. As with the other compositions prepared above, much of this flexibility was present even at low temperatures (down to —40° F.). Moreover the propellant continued to exhibit satisfactory physical properties at temperatures slightly in excess of 140° F. This composition consisted of 9.6% nitrocellulose, 54.5% TEGDN, 33.6% HMX, 1.8% acetylferrocene, 0.3% nitroglycerin, and 0.2% 2-nitrodiphenylamine.

EXAMPLE VI

The procedure of Examples IV and V were repreated with the exception that ferrocene and acetylferrocene were omitted respectively. The resulting compositions were entirely unsuitable for propellants. They had a very soft, putty-like consistency, even at room temperature.

EXAMPLE VII

Using the procedure set forth in Example I(a), three additional batches of propellant composition were prepared as shown in Table I below.

TABLE I

| Ingredient | Composition (percent by weight) | | |
|---|---|---|---|
| | A | B | C |
| Nitrocellulose [1] (12.6% N) | 13.5 | 13.5 | 10.8 |
| Nitroglycerin [1] | 1.3 | 1.3 | 1.1 |
| 2-nitrodiphenylamine [1] | .2 | .2 | .1 |
| Resorcinol | 1.0 | 1.0 | 1.0 |
| Ammonium perchlorate | 32.0 | 32.0 | 48.0 |
| TEGDN | 33.0 | 33.0 | 19.0 |
| TMETN | | | 19.0 |
| Aluminum | 17.0 | 17.0 | |
| Ferrocene | 2.0 | | 1.0 |
| Acetyl ferrocene | | 2.0 | |

[1] Indicates ingredient was in ball powder.

NOTE.—All three propellant compositions were completely satisfactory for use of the temperature range of —40° F. to 140° F.

EXAMPLE VIII

The procedure of Example I(a) was repeated except that five grams of ferrocene and five grams of acetylferrocene was substituted for the ten grams of ferrocene. The results were substantially identical to those observed in Example I(a).

The mechanism by which ferrocene and its derivatives permit curing of nitrocellulose containing less than 12.5% N and the increase in plasticizer content is not completely understood at this time. However, preliminary investigations suggest that the dicyclopentadienyliron serves as a crosslinking agent for nitrocellulose. This would account for the results achieved.

The above detailed description is for purposes of illustration only. No undue limitations should be attributed to the invention as a result thereof except as reflected in the appended claims.

I claim:

1. The method of curing nitrocellulose, said method comprising bringing together in intimate admixture nitrocellulose and a plasticizer therefor in the presence of a curing agent selected from the group consisting of ferrocene, ferrocene derivatives, and mixtures of these, said plasticizer being a member selected from the group consisting of nitroglycerin, hydroxyglycerol trinitrate, butane triol dinitrate, diethylene glycol dinitrate, triethylene glycol dinitrate, trimethylolethane trinitrate, dibuyl phthalate, dimethyl sebacate, dibutyl succinate, dibutyl adipate, triacetin, ethyl diphenyl phosphate, tributyl phosphate, dinitriles having up to twelve carbon atoms in the molecule, tetrazole derivatives and mixtures of at least two of these.

2. The method according to claim 1 wherein said curing agent is present in a weight ratio of agent to nitrocellulose of about 1:5 to about 1:20.

3. The method according to claim 2 wherein said plasticizer is present in a weight ratio of plasticizer to total weight of plasticizer and nitrocellulose of up to about 0.8:1.0.

4. The method of curing nitrocellulose, said method comprising bringing together in intimate admixture nitrocellulose and a plasticizer therefor in the presence of a curing agent selected from the group consisting of ferrocene, lower alkanoyl substituted ferrocene, lower alkyl substituted ferrocene, hydroxyalkyl substituted ferrocene wherein the hydroxyalkyl substituent contains up to six carbon atoms, ferrocene carboxylic acid, ferrocene acetonitrile, and mixtures of at least two of these, said agent being present in a weight ratio of agent to nitrocellulose of about 1:5 to about 1:20, said plasticizer being a member selected from the group consisting of nitroglycerin, hydroxyglycerol trinitrate, butane triol dinitrate, diethylene glycol dinitrate, triethylene glycol dinitrate, trimethylolethane trinitrate, dibutyl phthalate, dimethyl sebacate, dibutyl succinate, dibutyl adipate, triacetin, ethyl diphenyl phosphate, tributyl phosphate dinitriles having up to twelve carbon atoms in the molecule, tetrazole derivatives and mixtures of at least two of these.

5. The method according to claim 4 wherein said curing agent is ferrocene.

6. The method according to claim 5 wherein said plasticizer is triethyleneglycol dinitrate.

7. The method of curing nitrocellulose containing at least 11.9% nitrogen, said method comprising bringing together in intimate admixture nitrocellulose and a plasticizer therefor in the presence of a curing agent, said agent being present in a weight ratio of agent to nitrocellulose of about 1:5 to about 1:20 and being a member selected from the group consisting of ferrocene, acetyl ferrocene, and mixtures of these, said plasticizer being a member selected from the group consisting of nitroglycerin, hydroxyglycerol trinitrate, butane triol dinitrate, diethylene glycol dinitrate, triethylene glycol dinitrate, trimethylolethane trinitrate, and mixtures of at least two of these.

8. The method according to claim 7 wherein the weight ratio of plasticizer to total weight of plasticizer and nitrocellulose is up to about 0.8:1.0.

9. A propellant composition consisting essentially of a cured intimate admixture of about 5% to about 30% nitrocellulose; about 30% to about 70% of a nitrate ester plasticizer for nitrocellulose; about 1% to about 5% of a curing agent selected from the group consisting of ferrocene, ferrocene derivatives, and mixtures of these; about 0% to about 20% of at least one powdered high energy fuel selected from the group consisting of aluminum, lithium, magnesium, boron, hydrides of these metals, and alloys of these metals with each other; and 0% to about 50% of a powdered inorganic oxidizer selected from the group consisting of ammonium perchlorate, ammonium nitrate, alkali and alkaline earth metal chlorates, alkali and alkaline earth metal perchlorates, and alkali and alkaline earth metal nitrates wherein all percentages express percent by weight of total composition.

10. A propellant composition consisting essentially of a cured intimate mixture of about 12% to about 15% nitrocellulose; 30% to 40% of a nitrate ester plasticizer for nitrocellulose; about 1% to about 2% of a curing agent selected from the group consisting of ferrocene, ferrocene derivatives, and mixtures of these; about 15% to about 20% of powdered aluminum and about 30% to about 35% ammonium perchlorate wherein all percentages express percent by weight of total composition.

11. The method of curing a propellant composition which comprises bringing together in intimate admixture nitrocellulose and a nitrate ester plasticizer in the presence of a curing agent selected from the group consisting of ferrocene, ferrocene derivatives and mixtures of these, the amounts of said nitrocellulose, plasticizer and curing agent being sufficient to provide concentrations thereof of about 5 to 30 weight percent, about 30 to 70 weight percent and about 1 to 5 weight percent respectively, in the resulting cured mixture.

References Cited

UNITED STATES PATENTS 3,002,830 10/1961 Barr _____ 149—88 X
3,109,761 11/1963 Cobb et al. _____ 149—19

BENJAMIN R. PADGETT, Primary Examiner

U.S. Cl. X.R.

149—20, 22, 38, 96, 97, 98